United States Patent [19]

Sides

[11] 4,284,284

[45] Aug. 18, 1981

[54] RETAINER ARRANGEMENT FOR TOOLS

[75] Inventor: Daniel H. Sides, New Freedom, Pa.

[73] Assignee: Black & Decker Inc., Newark, Del.

[21] Appl. No.: 8,229

[22] Filed: Jan. 31, 1979

[51] Int. Cl.³ .............................................. B23B 31/08

[52] U.S. Cl. ..................................... 279/19.5; 279/97; 403/328; 408/239 R

[58] Field of Search .................. 279/97, 86, 19.5, 1 B, 279/19; 408/240, 239 R; 403/324, 325, 328

[56] References Cited

U.S. PATENT DOCUMENTS

| | | | |
|---|---|---|---|
| 302,519 | 7/1884 | Parsons | 279/97 X |
| 1,566,849 | 12/1925 | Fox | 403/328 |
| 1,809,823 | 6/1931 | Altvater | 279/97 |
| 1,833,236 | 11/1931 | Smith | 279/19.5 |
| 3,864,048 | 2/1975 | Parker | 403/328 X |
| 3,945,653 | 3/1976 | Falchle | 279/97 |

FOREIGN PATENT DOCUMENTS

| | | | |
|---|---|---|---|
| 210214 | 2/1906 | Fed. Rep. of Germany | 279/86 |
| 1103112 | 10/1955 | France | 279/86 |

*Primary Examiner*—Z. R. Bilinsky
*Attorney, Agent, or Firm*—Harold Weinstein; Leonard Bloom; Edward D. Murphy

[57] ABSTRACT

There is disclosed a tool retaining mechanism employing a nose piece including an axially extending, longitudinal bore which accepts the tool bit. The nose piece includes a first opening which is disposed so as to cut through a portion of the bore. Slideably disposed in the opening is a retaining pin which includes a first cutout which cooperates with the profile of the bore and the tool bit, in a first position, to allow insertion or removal of the bit. Means are described for urging the pin axially in its opening to a position where it cooperates with the contour of the bit to retain the latter in the tool once inserted.

4 Claims, 11 Drawing Figures

RETAINER ARRANGEMENT FOR TOOLS

FIELD OF THE INVENTION

The present invention relates to retainers for tools and more particularly to a spring biased mechanism which automatically positions itself in a bit retention position when released by the operator.

BACKGROUND OF THE INVENTION

Tool bit holders and retainers are required for power tools such as hammers and drills. The reader is quit familar with the chuck type holder which is screwed down on the bit and holds it in a locked position.

Other types of holders and adapters have been designed over the years and generally accommodate particular applications. Such designs are described in U.S. Pat. Nos. 1,969,798, 2,236,121, 2,816,770 and 3,726,533. The aforementioned '798 and '121 patents relate particularly to hammer type tools.

It is a primary object of this invention to provide another type of tool bit retaining mechanism which is automatic, in that, once the bit is inserted into the tool, the retaining mechanism is spring biased so as to automatically lock the bit in place once released.

It is another object of this invention to provide a tool retaining mechanism which is simple to fabricate, made from inexpensive materials, and thus a relatively cheap addition to the tool.

It is yet another object of this invention to provide a tool retaining mechanism which is simple to operate, requiring but one operator action prior to inserting or removing the tool bit.

SUMMARY OF THE INVENTION

Towards the accomplishment of these and other objects and advantages which will become apparent from the following specification and drawings, there is disclosed a tool retaining mechanism comprising a nose piece means having an axially extending, longitudinal bore for accepting the tool bit. The nose piece further includes a first opening, disposed in relation to the axially extending bore such that the former cuts through a portion of the bore. A tool bit retaining pin means is slideably disposed in the first opening, the retaining pin means having a first cutout disposed thereon which is contoured such that in a first position of the pin as located in the first opening of the nose piece, the first cutout cooperatively aligns with the axially extending bore so as to allow insertion and removal of the tool bit. Means for urging the tool bit retaining pin axially along the first opening are provided, such that the first cutout is positively urged away from cooperative alignment with the bore when the pin is released. Keeper means are provided for holding the urged tool bit retainer pin means in a second position, in the first opening, in relationship to the bore. The shape and contour of the tool bit retainer pin means when aligned in the second cooperative position compliments the shape and contour of the tool bit so as to retain the latter in the tool.

More particularly the nose piece means comprises a second opening, disposed in relationship to said first opening, such that it communicates therewith. Further, the tool bit retaining pin means includes a second cutout axially extending a portion of the length of the retainer pin means, the pin means orientated vis a vis the first opening in the nose piece such that the second cutout is disposed in a communicative relationship with the second opening. Also, spring means are disposed in the second cutout of the tool bit retainer pin means, with means for biasing the spring means disposed in the second opening of the nose piece in such a way so as to extend into the second, cutout portion of the pin, and against one end of the spring means, the opposite end of said spring means contacting one end of the second cut out. The biased spring means urges the tool bit retainer pin means, as noted above, along the first opening such that the first cutout is urged away from cooperative alignment with the longitudinal bore.

Further, the invention is drawn to a retainer arrangement for tools including the combination of the above with a tool bit having a portion of its shank of predetermined shape and contour which cooperates with the shape and contour of said pin means at the second cooperative position to retain the bit in the tool.

BRIEF DESCRIPTION OF THE DRAWINGS

The drawings to be considered in discussing the invention are as follows.

FIGS. *6a* and *6b* are two views of the pin means portion of the present invention.

Figure 3:
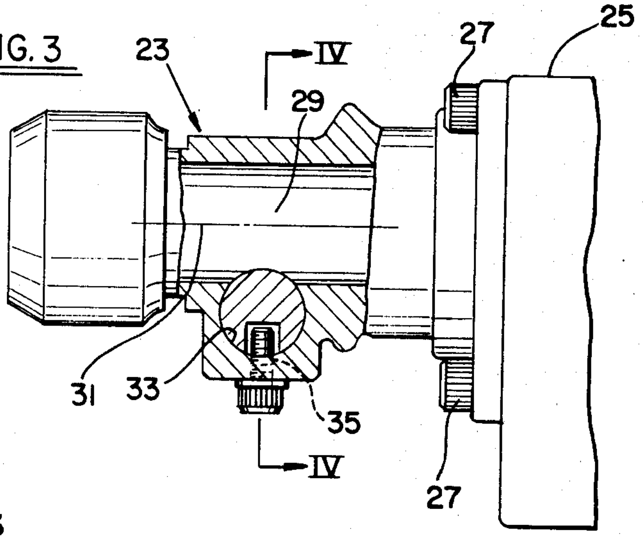
FIG. 3 is a sectional view of a portion of the present invention.
Figure 7:
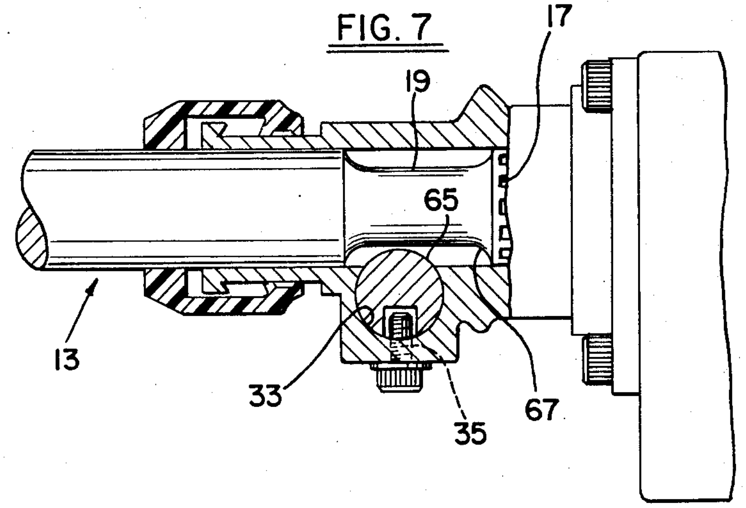

FIG. 7 is a sectional view, similar to FIG. 3, showing a portion of the tool bit, when the latter is in place in the retaining mechanism, and showing the cooperative action between the mechanism of the present invention and that bit.

Figure 8:
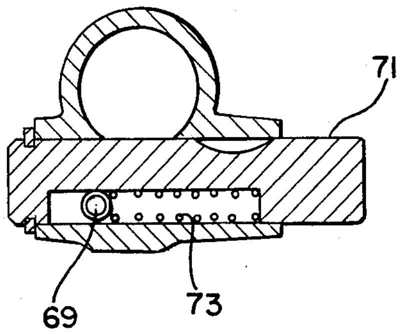
Figure 9:
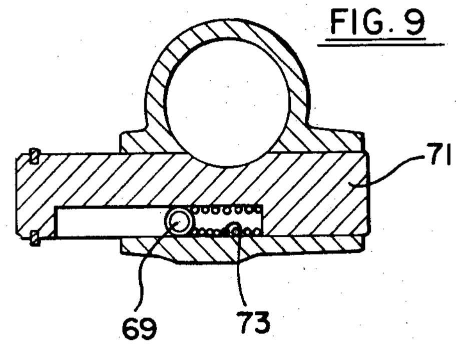
Figure 10:
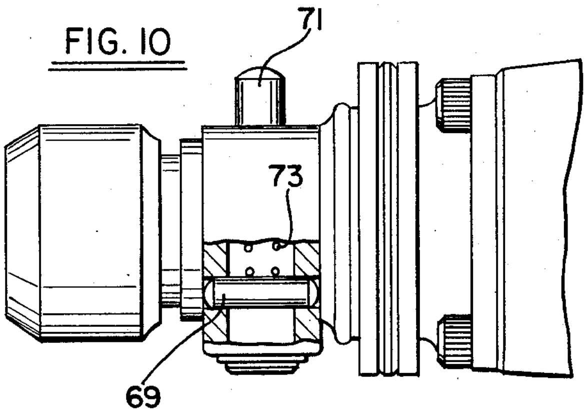

FIGS. 8 through 10 show an alternate embodiment of a portion of the present invention.

DESCRIPTION OF THE PREFERRED EMBODIMENT

Figure 1:
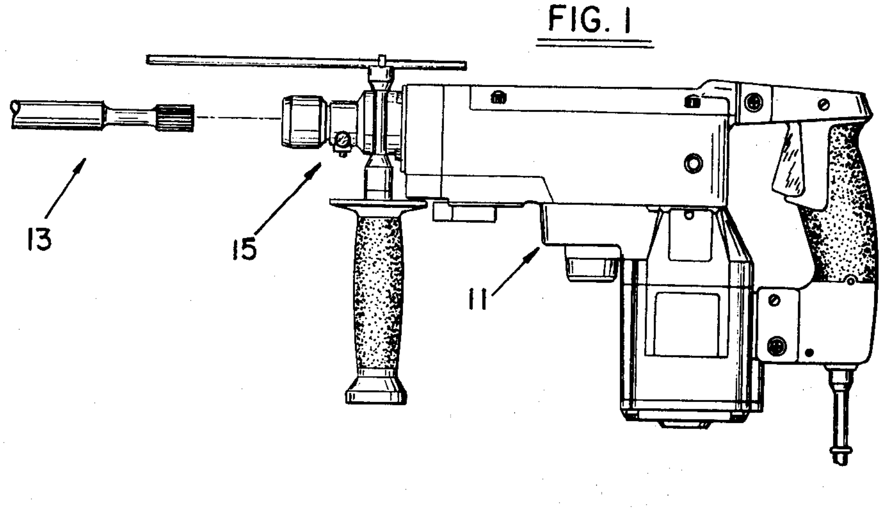
FIG. 1 is an elevation view of a tool and tool bit, with that portion of the tool reflecting the present invention circled.

Referring now to FIG. 1, there is shown an elevation view of a typical tool 11, such as a power hammer tool, with appropriate bit 13 prior to insertion. The invention concerns itself with the bit retaining mechanism shown at 15.

Figure 2:
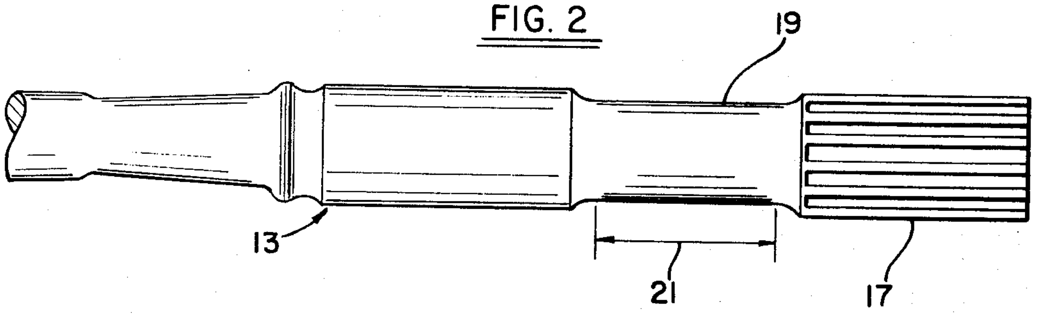
FIG. 2 is an elevation view of a typical bit used in the invention.

FIG. 2 depicts a typical bit which might be employed with the present invention. The bit 13 might included a spline end 17 or other standard shape which is compatible with the bit receiving member in the tool. The present invention requires the bit to have a portion of its shank of prescribed shape and contour. This is the undercut portion 19, on the bit. This is a section typically near the end 17. For power hammer type tools, the undercut portion 19 will extend an axial distance 21 to allow for appropriate axial movement of the bit in response to the stroke or hammering action of the tool.

Referring to FIG. 3, the retaining mechanism of the present invention is shown in section. It includes a nose piece 23, typically a cast iron or steel part which may be hardened, and which is secured to the housing of the tool 25 by suitable means such as screws 27.

The nose piece includes an axially extending bore 29 having a longitudinal axis 31. As shown in FIG. 3, transverse to the axis of the bore 29, there is a first opening 33. It is located in the nose piece such that it cuts through a portion of the bore.

A second opening 35 is formed in the nose piece. This is typically transverse to the axis of the first opening and communicates with the latter. The second opening typically might be a drilled hole which is threaded to accept an allen head screw or the like.

Figure 4:
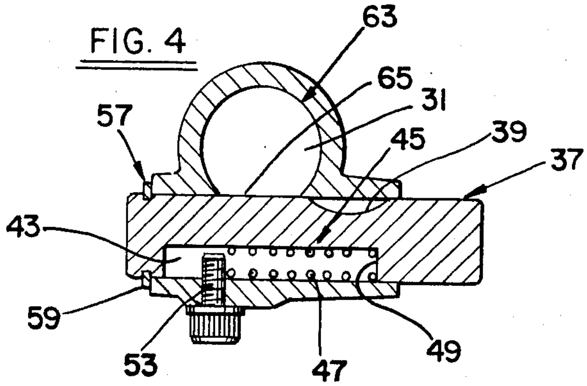
FIG. 4 is a sectional view taken along lines IV—IV of FIG. 3, showing the mechanism in the bit retaining position.
Figure 5:
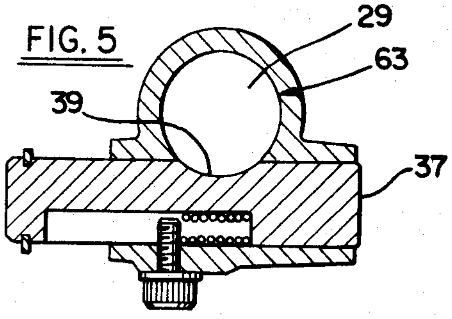
FIG. 5 is a sectional view along lines IV—IV of FIG. 3, showing the mechanism of the present invention in the bit insertion or removal position.
Figure 6A:
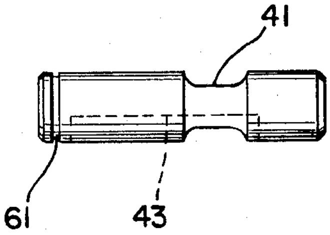
Figure 6B:
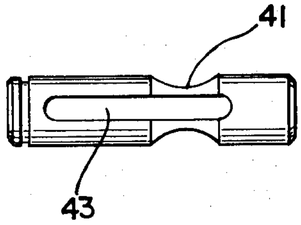

Referring now to FIGS. 4, 5 and 6, there is shown portions of the present invention as well as the two operational modes. A tool bit retaining pin 37 is shown disposed in opening 33. The pin includes a bore segment or first cutout portion 39 which, typically, would be an annular groove 41 as best seen in FIG. 6.

The retainer pin further includes a second cutout portion 43 which extends a portion of the axial length of the pin.

The pin 37 is orientated in the opening 33 such that the cutout 43 is disposed over the opening 35 (see FIG. 7).

FIGS. 4 and 5 further disclose means 45 for urging the pin axially in the opening 33. These means include, typically, a spring 47 disposed in the cutout 43. One side of the spring is positioned against the end 49 of the cutout, while the other end of the spring is butted up against screw 53 in the opening 35.

The spring is designed such that it is in compression when disposed between the screw 53 and the end 49. As such, the pin is urged axially to the right when viewed in the figures.

Keeper means 57 are employed to retain the pin in the opening 33. It includes a spring type retaining ring 59 when is disposed in a groove 61. This ring catches the flange portion surrounding the opening 33 and restrains the pin in the position shown in FIG. 4.

FIG. 4 would be the bit inserted or at-rest position for the mechanism of the present invention. FIG. 5 shows the pin in the tool bit insertion or removal position. In the latter, the pin is urged axially to the left as viewed in that figure by the operator's finger until the cutout portion 39 is aligned with the bore 29-that is, as seen in profile, the contour of the groove 39 forms a part of the periphery 63 of the bore.

This periphery compliments the profile of end 17 of the bit employed so as to allow the insertion or removal of the latter.

Once the intended operation is complete, the operator removes his finger from the pin and the latter is urged to its at-rest position of FIG. 4 by the spring action of spring means 47. Again, this is the position depicted in FIG. 4. This figure shows that in this position, there is no longer the cooperative alignment of the groove 39 with the perimeter 63 of the bore. The pin shank 65 interrupts this perimeter and cooperates with the shape and contour of the bit, when the latter is in the tool, to retain it therein. FIG. 7 best illustrates this cooperative action.

From FIG. 7, it is seen that the tool bit 13 has been inserted into the tool with end 17 nesting in the appropriate socket in the tool. The profile of the shank in the area 19 cooperates with the pin shank 65. The latter is seen to extend sufficiently into the bore of the nose piece so as to provide an interference to the shoulder 67 of the bit. This allows for limited axial movement of the bit (for this type bit) and acts to retain the latter in the unit.

The pin 37 typically, would be circular in shape, however, the present invention is not limited to such a configuration.

The particular tool illustrated in FIGS. 3 and 7 is a power hammer. As such, the distance 21 (see FIG. 2) affords sufficient axial movement of the bit to serve the purposes of the tool. Of course, the undercut 19, could be reduced in axial length such that its profile as viewed in FIG. 7 would be such as to compliment almost exactly the profile of the pin shank 65. This would be the case where only rotational movement of the bit occured.

FIGS. 8, 9 and 10 show another, alternate arrangement for the urging or spring biasing means described above. Here pin 69 is inserted in a suitable second opening in the nose piece which, again, passes through the first opening 33. Here, however, the longitudinal axis of the second opening is parallel to the axis of the bore. Pin 71 is urged by the biased spring means 73 to the right as viewed in FIG. 8, while the pin is retained in the opening by the means described above. The insertion mode, FIG. 9, is effected the same way as described above.

Thus, there is described a simple and inexpensive bit retaining mechanism having application to both hammer and rotational power tools. All parts are self contained within the nose piece and there is no concern for their misplacement or the like.

The operator by a simple visual check can ascertain whether the retaining mechanism is "opened" or "closed". The closure of the mechanism is automatic which enhances the safety aspect of the tool.

Other modifications and adaptations of the various parts of the invention will be apparent to those skilled in this art. The breadth of the present invention is not to be limited to the embodiments described above, but rather is to be gauged by the scope of the appended claims.

What is claimed is:

1. A tool bit retaining mechanism for a hammering power tool having a housing comprising:

(a) a tool bit having a shank with an annular undercut portion formed thereon, (b) a bit receiving member carried on the housing and having a bore therein for receiving the tool bit along a tool bit axis, (c) the bit receiving member having a transverse portion, (d) the transverse portion of the bit receiving member having a first opening to define a retaining axis, said portion traversing the bore, (e) the retaining axis lying outside of the bore, (f) the first opening at its perimeter being in communication with the bore, (g) a retaining member being slidingly disposed in the transverse portion in a first or second position and having a body portion therein intersecting the bore when the retaining member is in its first position, (h) the body portion having an upper surface extending about a part of the body portion periphery, (i) means connected to the retaining member for yieldably urging the retaining member into its first position, (j) means mounted in the transverse portion for biasing the urging means while preventing rotation of the retaining member about the retaining axis, (k) a cutout formed only in the upper surface of the body portion and being positioned across the bore to permit the bore to make its full opening when the retaining member is depressed against the biasing means into its second position, (l) the tool bit shank being slidably received within the bore of the bit receiving member when the retaining member is in its second position, and (m) the annular undercut portion of the tool bit having a predetermined axial length and terminating at each end in an interior shoulder, at least one shoulder being engageable by the retaining member when the retaining member is in its first position, the tool bit thereby being retained in the tool and partaking of the tool's hammering motion.

2. The combination claimed in claim 1 wherein:

(a) the retaining member defining a pin, (b) the cutout of the pin defining a first arcuate cutout, (c) a second cutout being formed within the pin remote from the first cutout, (d) the urging means including a spring, and (e) the spring being disposed within the second cutout.

3. The combination claimed in any of claims 1 or 2 wherein:

(a) a keeper means is externally connected to the retaining member in spaced relation to the urging means.

4. The combination claimed in claim 3 wherein:

(a) the retaining member in the first position having one end thereof biased to extend outwardly of the bit receiving member, (b) said one end being depressible to place the retaining member in its second position, and (c) the keeper means being externally connected to the other end of the retaining member to prevent the retaining member from being removed from the opening of the transverse portion.

* * * * *